United States Patent [19]

Kronseder

[11] Patent Number: 4,923,571
[45] Date of Patent: May 8, 1990

[54] APPARATUS FOR SPACING APART CONTAINERS THAT ARE CONVEYED CLOSE TO EACH OTHER IN A SINGLE LANE

[76] Inventor: Hermann Kronseder, Regensburgerstrasse 42, D-8404 Worth/Donau, Fed. Rep. of Germany

[21] Appl. No.: 263,537

[22] Filed: Oct. 27, 1988

[30] Foreign Application Priority Data

Nov. 4, 1987 [DE] Fed. Rep. of Germany ... 8714646[U]

[51] Int. Cl.[5] ............................................. B65G 47/26
[52] U.S. Cl. ................................. 198/459; 198/467.1; 198/454; 198/620; 198/836
[58] Field of Search .................... 198/459, 836, 467.1, 198/463.4, 624, 625, 454, 627, 620

[56] References Cited

U.S. PATENT DOCUMENTS

| | | |
|---|---|---|
| 2,156,020 | 4/1939 | Lathrop . |
| 2,571,036 | 10/1951 | Heyne et al. ........................ 198/459 |
| 2,645,399 | 7/1953 | Bozek et al. ................. 198/467.1 X |
| 2,692,671 | 10/1954 | Day et al. ............................ 198/459 |
| 2,730,226 | 1/1956 | Day et al. ............................ 198/459 |
| 2,768,656 | 10/1956 | Day et al. ..................... 198/467.1 X |
| 3,527,336 | 9/1970 | Johnston . |
| 4,566,583 | 1/1986 | Schneider ........................... 198/459 |
| 4,793,461 | 12/1988 | Leonard ....................... 198/463.4 X |

FOREIGN PATENT DOCUMENTS

| | | |
|---|---|---|
| 1875084 | 7/1963 | Fed. Rep. of Germany . |
| 3015203 | 10/1981 | Fed. Rep. of Germany ...... 198/459 |
| 3116334 | 11/1982 | Fed. Rep. of Germany . |
| 3207460 | 9/1983 | Fed. Rep. of Germany . |
| 3148194 | 11/1985 | Fed. Rep. of Germany . |
| 3425516 | 1/1986 | Fed. Rep. of Germany . |

Primary Examiner—Robert J. Spar
Assistant Examiner—Lyle Kimms
Attorney, Agent, or Firm—Fuller, Ryan & Hohenfeldt

[57] ABSTRACT

A screw conveyor for conveying containers such as bottles and cans is arranged adjacent a guide rail which restrains the containers to stay in the groove of the screw until they are discharged, this being known per se. The angles for the screw conveyor and guide rail are adjustable to assure guidance of the center points of containers of any size along the same straight line without relying on inserting test containers. The guide rail is supporting on a transversely movable carriage and is pivotable thereon. The undriven end of the screw is supported on a member which is movable by a small amount. Stop elements such as bolts having different lengths are mounted in groups on a slidable member to enable positioning concurrently a stop element for the screw conveyor and a stop element for the guide rail pertaining to a particular container size and the stop elements react against stops on the carriage and the screw conveyor support member.

16 Claims, 8 Drawing Sheets

APPARATUS FOR SPACING APART CONTAINERS THAT ARE CONVEYED CLOSE TO EACH OTHER IN A SINGLE LANE

BACKGROUND OF THE INVENTION

The invention disclosed herein relates to apparatus for changing the spacing between containers that are transported in a single lane on a belt-type or closed loop conveyor before the containers enter a machine, such as a labeling machine, in which they must have a specific space between them.

Mechanisms of the types mentioned are commonly employed in beverage container handling machines of various types. As the containers are transported on a belt conveyor in single file, a screw conveyor usually engages the containers in the form of bottles or cans and advances them in spaced apart relationship. The spacing for the last turn or groove or thread of the screw conveyor corresponds to the spacing required for the machine in which the containers are to be entered. Since container handling machinery is usually designed for processing containers of various sizes and shapes, apparatus for separating and spacing the containers should be adjustable. In addition, the containers in the apparatus that precedes the machine must be aligned to one common path that relates to the center point of the mouths or top openings of the containers for proper operation of the machine that follows.

Customarily there is a guide rail situated adjacent and generally parallel to the screw conveyor which is transversely displaced by a distance depending on the width of the containers and a section of rail situated directly across from the screw conveyor must also be angularly adjusted, since the alignment of the containers in this area must agree with the path of the center point of the mouths of the containers. This can be done, for example, by using a screw conveyor having an increasing core diameter or an angularly adjustable screw conveyor having a constant core diameter.

In known apparatus of this type, guide rails supported on guide rods by clamps or by means of guides that have slots for sliding along fixed bolts, until now, have been adjusted by placing sample bottles or cans, that serve as a gage for the new size of the container in the first and last turns of the helical groove in the screw conveyor. This method is relatively time consuming since service personnel must loosen numerous bolted connections by hand, readjust the mentioned rail sections on the sample bottle size and then tighten them again. This work is particularly inconvenient and time consuming in labeling machines, since the guide rail located at the input to the labeling machine is difficult to access because the labeling mechanism is arranged at the back of the labeling machine table. Moreover, the conventional adjustment method using sample bottles is relatively inaccurate especially when the screw conveyor comprises a flexible contoured device where the helical groove of the screw is defined by brush bristles to form a configuration similar to the worm of a worm-wheel drive. Brush type screw conveyors are now commonly used for PET (polYethylene terephthalate) bottles. Sometimes the rail section is set so as to be too narrow whereupon the flow of containers is unnecessarily retarded and possibly jammed.

SUMMARY OF THE INVENTION

The invention provides for rapidly and easily converting a screw conveyor for handling containers of different sizes and shapes, that is, for establishing a predetermined distance between containers which are captured by the screw conveyor following the containers are being transported in single file in contact with each other.

An important feature of the invention resides in providing adjustable stop units which accurately establish the desired position of the guide rails for containers of different sizes. During a changeover, no sample bottles are required as has been the case heretofore. Instead, in accordance with the invention, groups of stop units mounted on a slidable member are shifted together for a selected one to determine the positions of the guide rails. As a result of having a stop unit from each group arranged on both sides of the middle of the guide rail at a certain distance in the direction of transport, a stable, precise positioning of the guide rail is achieved even though the guide rail may be variously angulated.

Quick adjustment of the stop units is achieved in a simple manner, according to a further development of the invention, by using a shiftable base provided with a locking element, on which the stop units that correspond to locking increments are adjustably fastened For each container size, the required projection of the stop units in each group from the shiftable base member are adjusted and secured once by the manufacturer, taking into consideration the various container sizes that will be conveyed. Later, during operation, only the adjustable base member needs to be brought into a locked position, for example, as indicated by colored markings that correspond to the container size.

To adjust positions of the guide rails that vary in spacing as well as angular position, at least two groups of stop units, having predetermined spacing in the direction of container transport, are required. It is therefore another advantageous feature of the invention to have all stop units arranged on a common base member with paired spacing in the direction of transport, such that corresponding stop units from both groups are brought into position at the same time with only one adjusting action, that is, by only adjusting the base member. This can be implemented by means of bar means that is supported so as to be horizontally movable on the housing of the conveyor, said bar means bearing stop units corresponding to the number of container sizes which are to be processed in the machine and also spaced in the form of pairs of threaded bolts which maintain their set positions by means of lock nuts.

Rapid conversion to different size containers results if the bar means which carry the stop units is supported on the front side which, in this case, is usually the side facing the screw conveyor which is next to the closed-loop conveyor since all of the required changeover operations can be carried out exclusively and easily from the front.

The stop units could be arranged on the rear of the conveyor too in which case a control would need to be installed on the front side and it would have to cross the conveyor housing. Such an arrangement would be useful if the sliding carriage which supports the guide rail in the conveyor housing in parallelism with the conveyor surface is formed of a single bar with a cross section which is not round, since in this case stop units arranged on the rear can act directly on the guide rail or on the parts arranged on it.

According to another aspect of the invention, the groups of stop units are arranged on the front of the path of movement of a sliding carriage consisting of two parallel bars. Both of the bars are guided in sleeve bearings in the housing of the conveyor structure underneath the conveyor surface and bear on one stop plate which coacts with the stop units.

During operation, the guide rail is prevented from shifting by means of special retaining elements. A threaded spindle, which on one hand can be advantageously used to adjust the sliding carriage and on the other hand to simultaneously maintain the desired setting through inherent locking of the threads is particularly well suited for this purpose. The spindle is manually adjustable and is arranged so adjustment of the guide rail can take place from the front of the machine. The threaded spindle that, in this case, acts as an actuator and positioning element can either make contact directly on the guide rail or indirectly through a transverse member which connects both rods of the sliding carriage. For this function, the side of the conveyor on which the transverse member is to be located thereby becomes immaterial. To adjust angularly a section of the guide rail that lies directly across from the screw conveyor, it must be possible for both rods of the sliding carriage to cover various regulating distances, as made possible, for example, by means of slotted holes in the bearing support of the guide or the bearings of the transverse member. In this way, a linear adjustment can take place between the suspension points, is necessary with various angular positions. Another possibility exists where both rods are rigidly connected with each other and arranged so as to tilt slightly in a plane parallel to the surface of the conveyor, for example, by providing appropriate play in the bearings.

If the shortest conversion time is imperative, instead of using the threaded spindle to reposition the guide rail supporting carriage, a rocking lever which is rotatably supported on the housing of the conveyor can be used. This lever slides in a bore hole of a pivot pin which in turn is connected to a connecting rod. The connecting rod, for its part, is connected with the guide rail by means of a swivel joint. Of course, in this case additional separate locking elements must be provided which reliably maintain the guide rail in the adjusted stop position because a sliding rod is not self locking as is a threaded spindle. Springs or clamping devices which act directly on the connecting rod and hold the carriage against the stop units are particularly suited for this purpose.

A small star wheel is arranged in a known fashion in the flow path of the containers just before the containers become engaged by the screw conveyor. This small star wheel rotates freely under the transport force of the moving containers but it can be locked to stop the flow of containers if there is a malfunction or overflow somewhere in the production line.

Since screw conveyors having a constant core diameter do not necessarily need to be exchanged with each container size changeover or conversion, with round containers having only slightly different diameters or shaped bottles with differing widths, it has not been possible until now to take advantage of the fact that the screw conveyor swivel around the vertical axis of its bevel gear drive. To achieve the correct path for the center point for the mouths of the containers, until now the screw conveyor had to be adjusted manually each time.

The simultaneous adjustment of the stop units for the screw conveyor and the guide rail is therefore a particularly time saving feature which, according to the invention, can be realized by means of a common base unit that serves for all of the required stop units. Moreover, an L-shaped combination stop unit and support member supports the end of the screw conveyor opposite of the driven end, which on one hand supports the screw conveyor so it is not disposed in cantilever fashion and on the other hand cooperate with its own stop units. At the same time, the proper height of the screw conveyor is also assured by means of a fixed pin supported on the conveyor and a corresponding hole in the stop member which hole allows the member to slide by a small amount on the pin. Locking of the L-shaped stop unit and support member can take place by means of an eccentric which is swivelably supported on the housing of the conveyor.

A more detailed description of a preferred embodiment of the invention will now be set forth in reference to the drawings.

DESCRIPTION OF A PREFERRED EMBODIMENT

Figure 1:
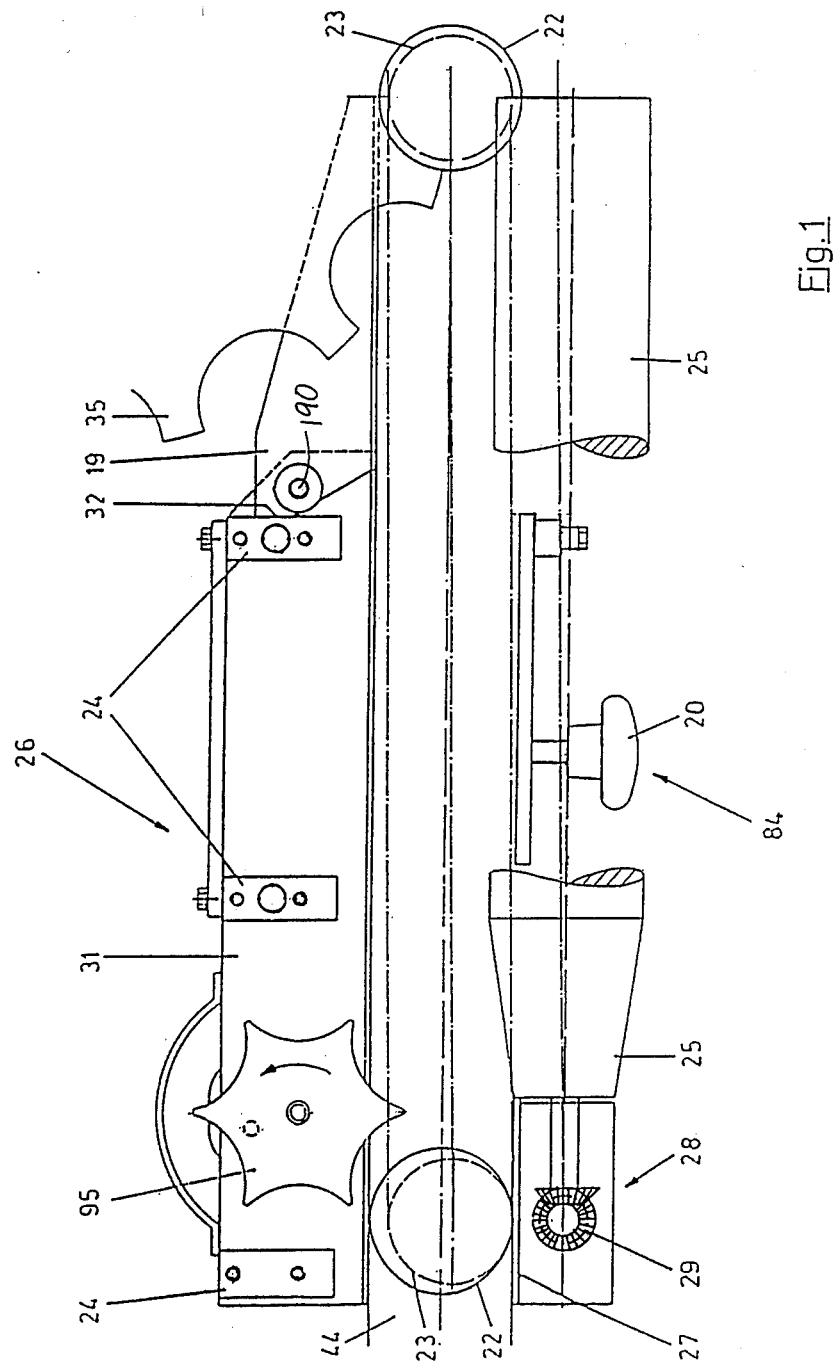
FIG. 1 is a top view of the screw conveyor whose axis is parallel to and above the path of movement of the closed loop belt-type conveyor which delivers the containers in single file to the screw conveyor.

FIG. 1 is a top view of the new apparatus for separating or establishing a predetermined spacing between containers which are being transported in a single lane on a first conveyor in the form of a closed loop conveyor 44 where the containers, such as bottles or cans, are engaged by a screw conveyor 25 for being advanced into a machine, such as a labeling machine. A portion of the label machine infeed star wheel 35, which engages the containers as they are discharged from the screw conveyor 25 is illustrated. It will be understood that there is another similar star wheel, not shown, that is below and congruent with star wheel 35 and rotates about the same axis so that there is a space between the two wheels. The star wheel 35, of course, rotates, and advances containers which reside in the pockets of the star wheel into the labeling machine in this example. The screw conveyor 25 is depicted in phantom lines in FIG. 1 and is shown in a realistic fashion in FIG. 7. Screw conveyors are by themselves well known to those familiar with handling container processing equipment. A guide rail assembly, generally designated by the numeral 26, is positioned directly across from the screw conveyor. A small blocking star wheel 95 is mounted to the guide rail assembly for rotating about a vertical axis. The star wheel 95 ordinarily, rotates freely as a result of coming in contact with the moving containers. However, a pneumatic operator, not shown, is provided for locking the star wheel 95 against rotation to thereby block transport of the containers to avoid an overflow down the line, for example.

Regardless of size and shape, all containers are continually supplied to the screw conveyor 25 along a fixed and unadjustable short immovable guide section 27 by means of conveyor 44. By way of example, if two round bottles 22 and 23 have different diameters, the centerpoint of the mouth of the smaller one 23 lies closer to the immovable guide section 27 by half of the difference in its diameter with respect to the larger diameter bottle 22. However, since the center axes of the smaller and larger bottles 23 and 22 must be advanced by the screw conveyor with their axes lying along the same straight line, the screw conveyor 25 with a constant core diameter, as well as the guide rail assembly 26 positioned across from the screw conveyor must be angularly adjustable as indicated by the dashed line of the path of the centerpoints. During the final turn of screw conveyor 25 which transfers a container to the star wheel 35, the centerpoint of the mouth of the smaller bottle 23 lies on the path of the center of the pocket of the star wheel as predetermined by the container handling machinery. For this to occur, the guide rail opposite the screw conveyor must not only be displaced angularly relative to the transport direction, but it must also be moved concurrently in parallelism approximately half of the difference of the diameters of the two bottles. The screw conveyor 25 is mounted for rotation about a generally horizontal axis and is driven rotationally by means of two bevel gears 28. The one bevel gear 29 is driven rotationally about a vertical axis and the other bevel gear has its axis at a right angle relative to the axis of gear 29 and is fixed to the screw conveyor 25 as shown in FIG. 1. Although it appears in FIG. 1 that the screw conveyor 25 is supported in cantilever fashion, such is not the case. There is a pin 39 that enters the end of the screw conveyor and serves as a journal support. This facilitates removing the screw conveyor when required.

Figure 3:
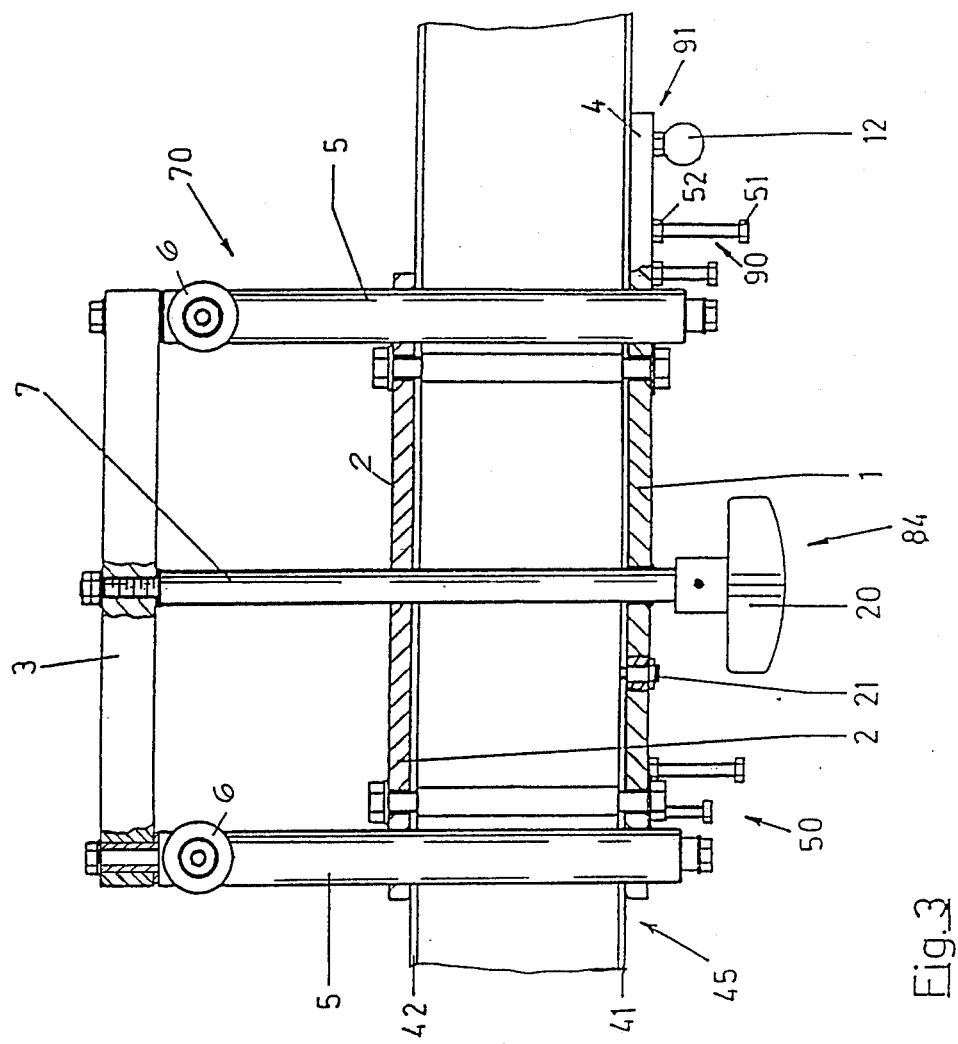
FIG. 3 is a similar longitudinal section through the housing of the conveyor showing another embodiment of a carriage an actuation mechanism.
Figure 5:
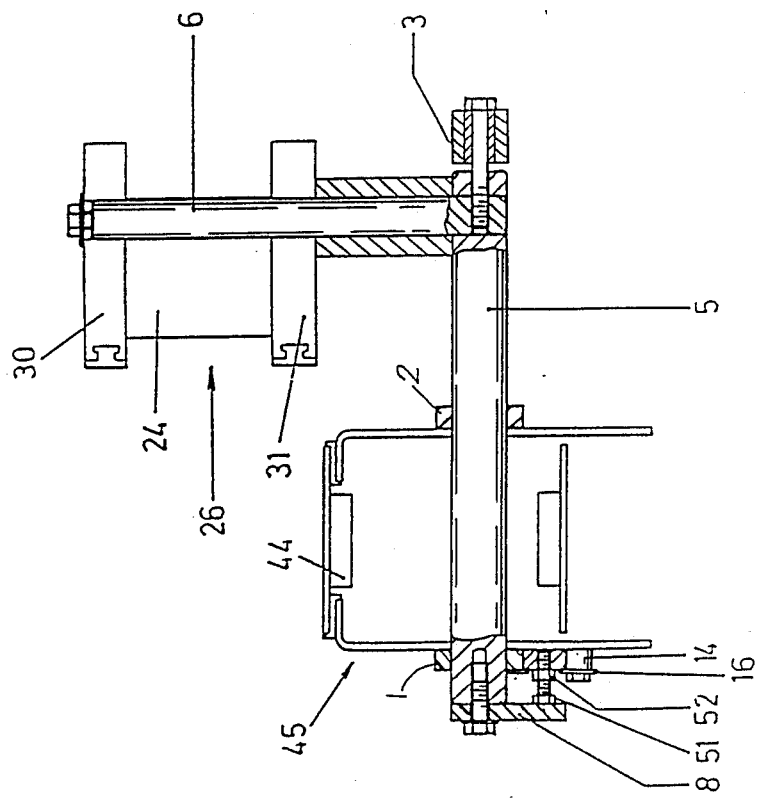
FIG. 5 is a vertical section taken on a line corresponding to 5—5 in FIG. 4 with a schematically illustrated guard rail but with the screw conveyor omitted.
Figure 6:
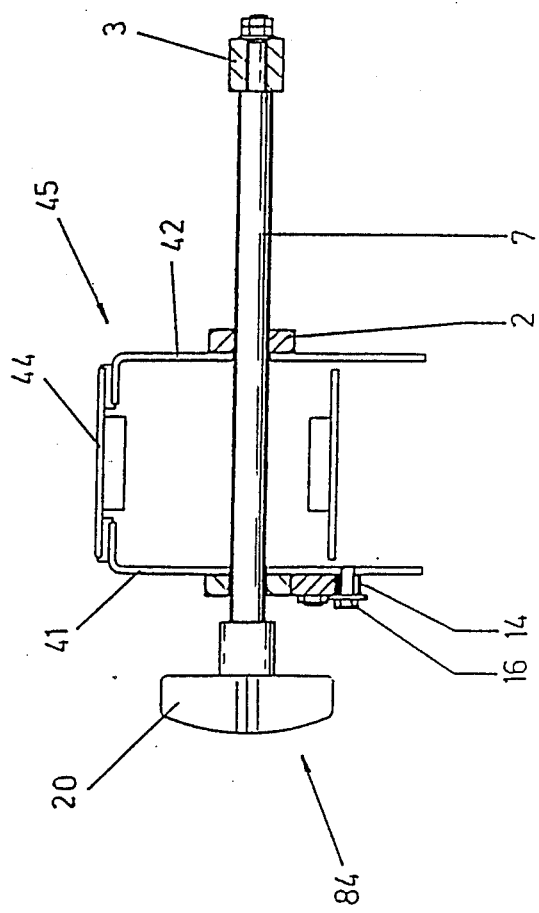
FIG. 6 is a vertical section taken on a line corresponding to 6—6 in FIG. 4.
Figure 8:
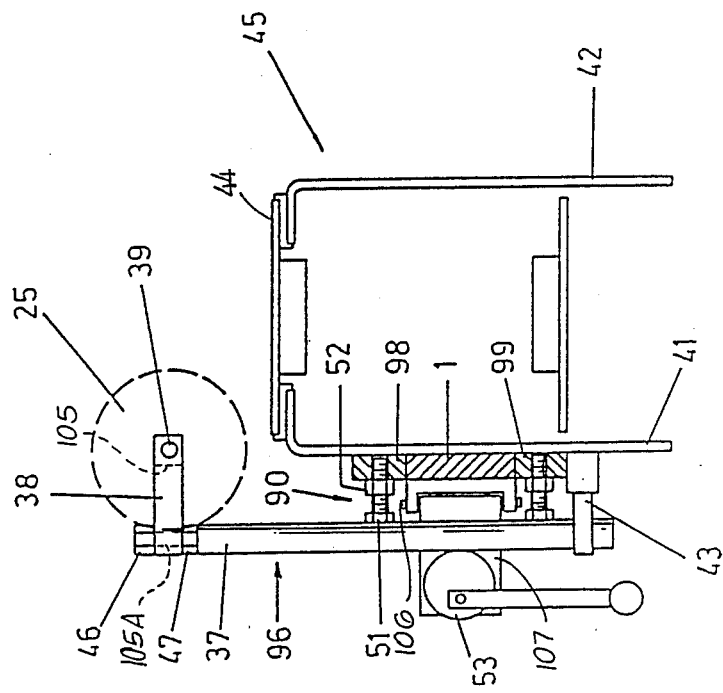
FIG. 8 is a vertical section taken on a line corresponding to 8—8 in FIG. 7.

A manual actuator device 84 is arranged below the screw conveyor 25 for adjusting guide rail 26. The manner in which the actuation device is constructed can be seen more clearly in FIGS. 3 and 6. In FIG. 6, the closed loop or first conveyor 44 is shown but the screw conveyor 25 has been omitted. On the other hand, FIG. 8 shows the relationship of the screw conveyor 25 relative to first conveyor 44. Referring now to FIGS. 3, 5 and 6, the guide rail 26 is constricted of two parts, that is, it consists of two horizontally arranged superposed guide plates 30 and 31 (FIG. 5) which are spaced from each other by means of spacer blocks 24 and are fastened to the spacer blocks by means of screws which are illustrated in FIG. 1. The blocking wheel 95 depicted in FIG. 1 is situated between the upper and lower guide plates 30 and 31.

In FIG. 1, the upper guide plate 30 has been omitted and the lower guide plate 31 is illustrated. Since usually the two part star wheel 35 must also be replaced along with the screw conveyor 25 when there is a changeover, an extension part 19 of the guide plates which looks like a wedge is supported for being swivelable about an axis 190 to provide for swinging it out from between the superposed star wheels 35 for permitting the star wheels to be lifted off their drive shafts. But the guide extension 19 affords guidance of a container until it enters the pocket on the star wheel and outward swinging of the extension 19 is prevented by the stop surface 32.

Figure 2:
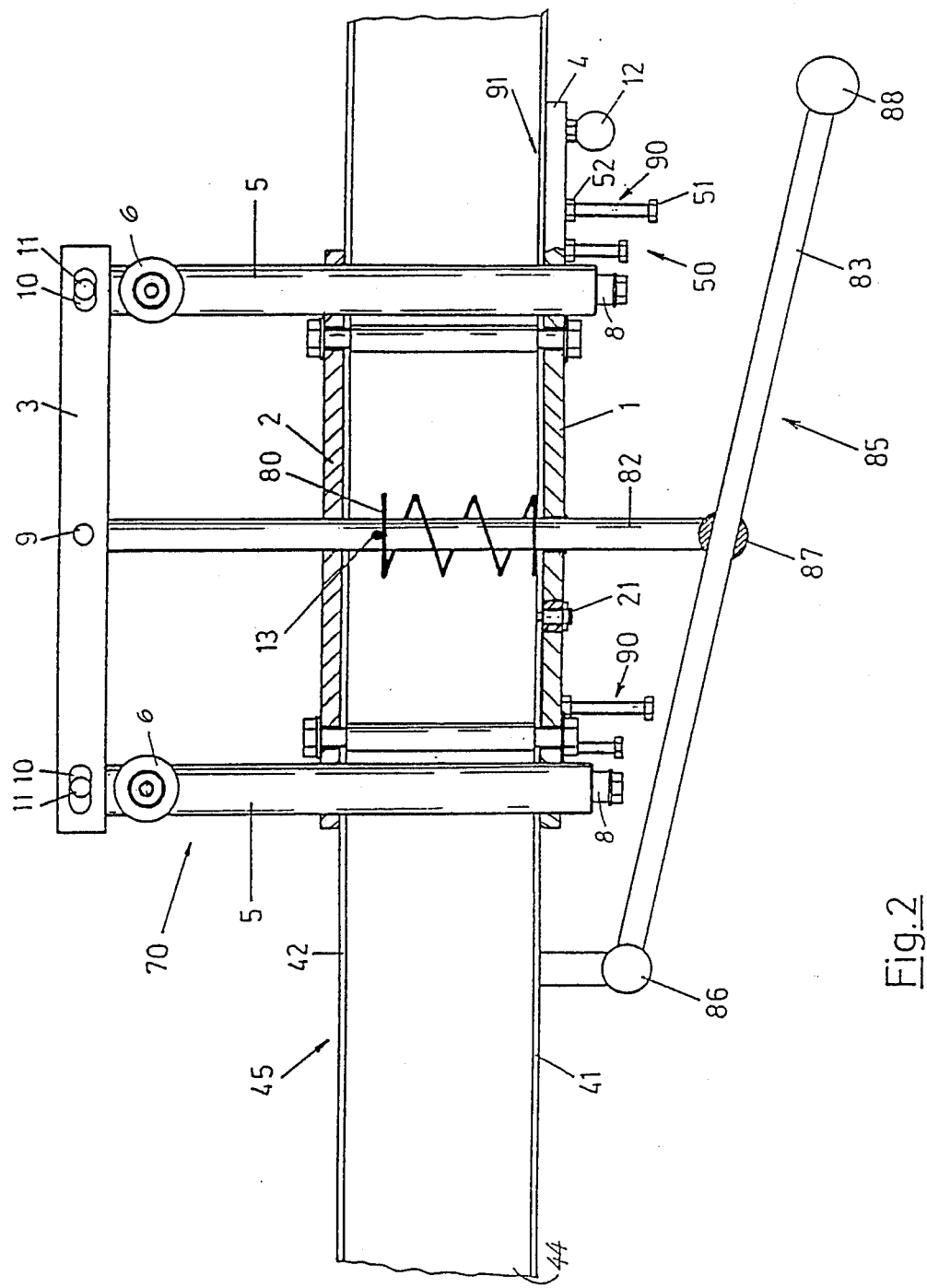
FIG. 2 is a longitudinal section of the housing of the conveyor depicted in FIG. 1 showing one embodiment of a carriage actuation mechanism.

FIG. 2 shows one embodiment of a sliding carriage which supports the guide rail assembly although the guide rail assembly is not shown in FIG. 2. Sliding carriage 70 is supported horizontally in the closed loop conveyor housing 45 and comprises two parallel rods 5 which are slidable in matching bore holes in both side walls 41 and 42 of conveyor housing 45. A push rod 82 is also similarly mounted for sliding through bore holes in side walls 41 and 42 in parallelism with rods 5. In the area of housing 45 in which the rods 5 and rod 82 pass through the conveyor housing, the housing is thickened and reinforced by two plates 1 and 2. Rods 5 and connecting rod 82 are connected by means of a transverse member or bar 3 at the center of which connecting rod 82 makes a swivel connection with the bar 3. Matching slotted holes 10 are provided for journal pins 11 of the rods 5. This makes possible setting the guide rail 26 obliquely. An actuator device 85 for actuating rod 82 is comprised of a rocking lever 83 arranged on the front side of the conveyor housing 45. One end of lever 83 is articulated so as to be swivelable in a horizontal plane on the front side 41 of conveyor housing 45 by means of a swivel joint 86. The rocking lever 83 slides through the bore in a pivot socket 87 arranged at the front end of the connecting rod 82. Rocking lever 83 has a handgrip 88 to allow the retracting or backing off of a stop plate 8 from the accompanying stop units 90 (see FIG. 2) by applying force against the resistance of the compression spring 80 rotated on the connecting rod 82. The stop units 90 are fixedly mounted in pairs with corresponding spacing in the transport direction of the containers on a common mounting means or base in the form of bar means 4 that is supported so as to be horizontally displaceable. The stop units are constituted by threaded bolts 51, which, with regard to their extension from bar means 4, can be adjusted corresponding to the required stop unit positions and can be secured by means of lock nuts 52. The setting of the stop units constituted by the threaded bolts 51 is done during assembly of the screw conveyor and depends on the sizes of the containers that are expected to be handled. Observe in FIG. 2 that when the lever 83 is pulled toward the bottom of the sheet so as to compress spring 80, cross rods 5 move toward handle 83 as do the stop plate 8 which are mounted to the ends of guide rods 5. As drawn, one of the stop units 50 is immediately behind each one of the stop plates 8. When the stop plates are drawn away from the stop units 50 or 90 that are presently behind the stop plates 8, the horizontal bar means 4 can be shifted lengthwise to place a different stop unit, such as a longer one, behind the stop plates 8 which are mounted on the end of guide rods 5. Because the guide rail assembly 26 is mounted to vertically extending rods 6 as indicated in FIG. 2, the guide rail assembly 26 is shifted at any time that handle 83 is operated. When horizontal bar means 4 is shifted to align the proper stop for a different size container with the stop plates 8, the handle is released and the stop plates are influenced by spring 80 to come into compressive relation with the newly aligned stop unit 50. Thus, the upper and lower guide plates 30 and 31 of the guide rail become placed at a different distance from the centerline of the screw conveyor 25. The bar means 4 is shiftable in steps, each one of which places a different one of the bolt-like stop units in alignment with stop plates 8. For this purpose, a locking element 21 shown in FIGS. 2 and 7, for example, is provided. It consists of a spring loaded detent ball, not perceptible, which interacts with suitable recesses, not visible, in the front side 41 of the conveyor housing. After the required stop body units 50 and 90 are brought into exact position under rolls 5, the actuation lever 83 is released and the force of spring 80 keeps the stop plates 8 in contact with the stop units 50 and 90.

Figure 4:
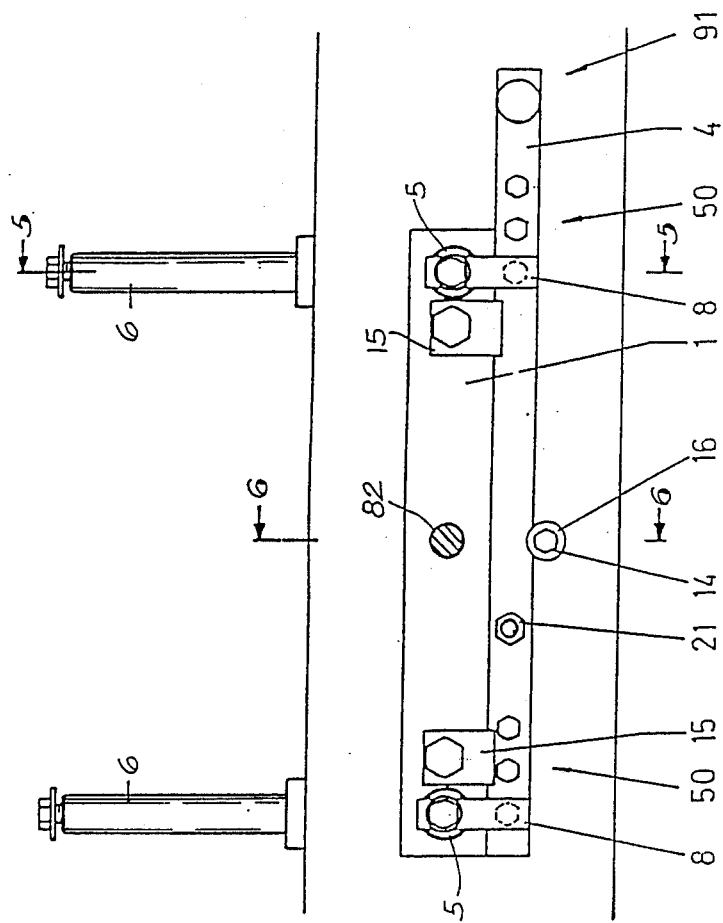
FIG. 4 is a front view of the apparatus depicted in FIG. 1 with the screw conveyor and guide rail removed.

The longitudinally slidable bar stop mounting means 4 is guided along the lower edge of the front conveyor housing reinforcement base plate 1 with the aid of stay bolts 14 (which are visible in FIGS. 4, 5 and 7) and two retaining plates which are fastened to the base plate 1 with bolts. Retaining plates 15 extend over the slide bar 4 with some free play. The stay bolts 14 are provided with a shim 16 or washer-like element which also overlaps bar means 4 with some free play. This provides accurate sliding movement for the bar means 4.

An alternate embodiment of the carriage depicted in FIG. 2 is shown in FIG. 3. The FIG. 3 embodiment differs mainly from the FIG. 2 embodiment of the carriage in respect to the manner in which the carriage actuation element is implemented. In the FIG. 2 embodiment, a push-pull rod 82 was used. In the FIG. 3 embodiment a threaded spindle which can be characterized as a lead screw 84 is used for moving the sliding carriage 70. The lead screw 7 is threaded over most of its length and passes through a mating thread in the front base plate 1 which reinforces conveyor housing 45. The spindle has a handwheel 20 at the front end. At the rear side of the conveyor 45 the two rods 5 and the threaded spindle or lead screw 7 are connected by means of a transverse member 3 which has three bore holes. Since the oblique positioning of guide rail assembly 26 entails only a few angular degrees, it is sufficient to provide some bearing play between the transverse member 3 and the rods 5 and the unthreaded portion at the end of the lead screw where it is captured and freely rotatable in transverse member 3. This can either be achieved by means of a somewhat larger diameter hole in the transverse member 3 and by allowing sufficient axial play for example, extending bearing bushings or by bolted connections with lock nuts. The bolted connections between rods 5 in FIG. 3 and the transverse member thereby assume the function of the slotted holes 10 in the FIG. 2 embodiment. The construction of the stop units 50 is identical to those illustrated in FIG. 2. Compared to the FIG. 2 embodiment, the actuation device 84 in FIG. 3 is simpler and therefore less expensive to manufacture. Having threads on the lead screw assures that the carriage can only move if the lead screw is turned manually so the lead screw can be considered the lock for the carriage. During a changeover, the spindle or lead screw 7 is operated only to shift the stop plates 8 away from what ever stop units are aligned with the plates at the time and, after the sliding bar means 4 is shifted to a position wherein the selected stop means 50 and 90 are aligned with the stop plates 8, the stop plates are tightened against the stop units again by screwing in lead screw 7.

Sometimes a changeover does not require that the screw conveyor 25 be exchanged but it will usually require a correction in its angular setting. Thus, it is desirable, according to the FIG. 7 embodiment, if the base unit 97 on which slidable bar means 4 is carried has additional stop units 55 for the screw conveyor. For this purpose, the base unit 97 includes two elongated bar means 98 and 99 that are supported to be slidable on the front wall 41 of the conveyor housing. The two bars or fillets 98 and 99 are arranged above and below the base plate 1. These bar members are rigidly connected to each other by means of transverse members 33. The stop units 55 which are provided for angular setting of the screw conveyor 25 include two groups of stop units 90, as shown in FIGS. 2 and 8, that are arranged vertically superposed at a spacing corresponding to the bars 98 and 99, said stop units consisting of threaded bolt 51 and lock nuts 52. The upper bar 98, in contrast to the lower one 99, has stop units 90 only in the area of the swivelable end of the screw conveyor 25.

Figure 7:
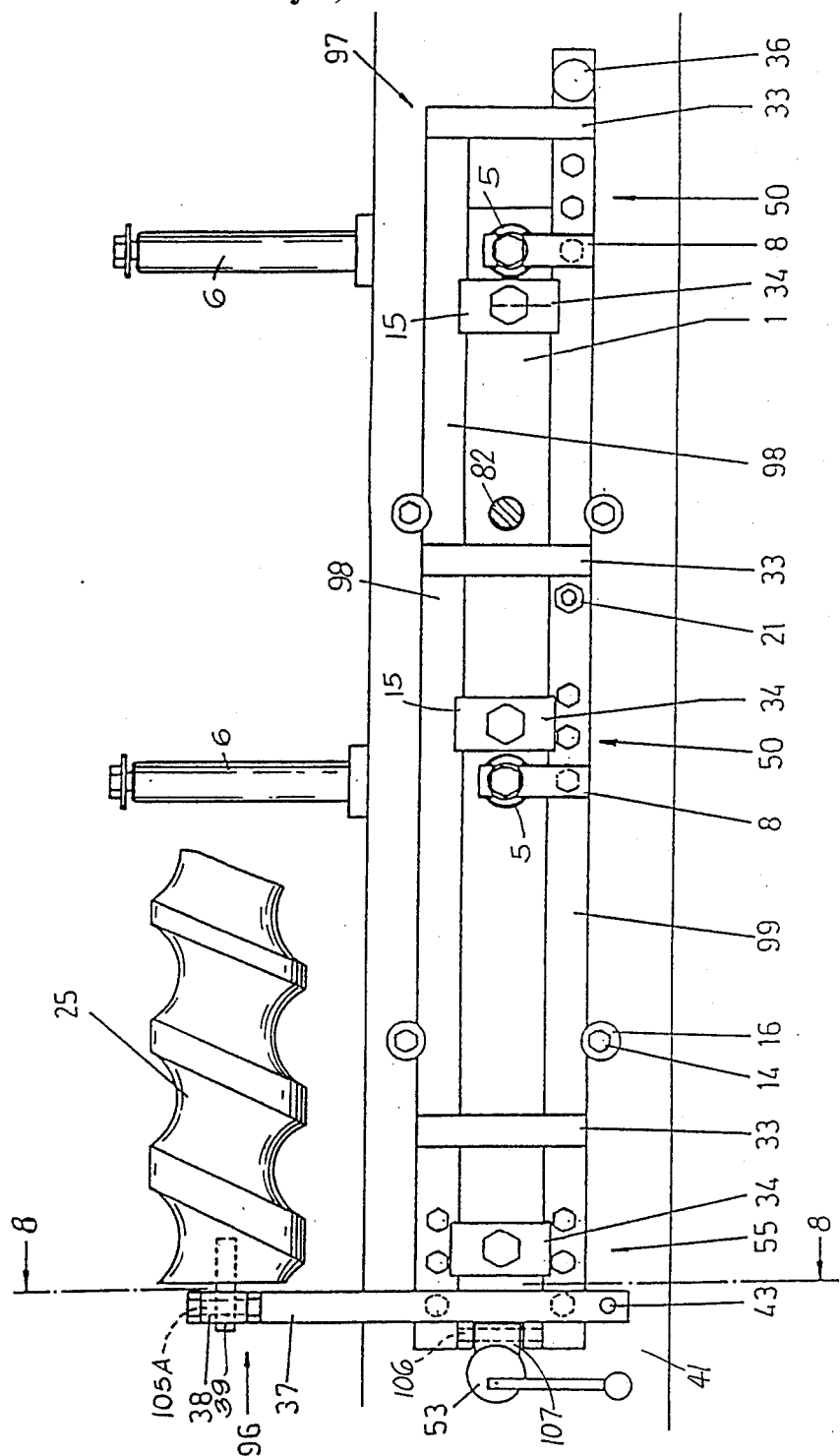
FIG. 7 is a front view of the container spacing apparatus with additional stop units for the screw conveyor.

For guiding the bars 98 and 99, there are stay bolts 14 screwed into front wall 41 of the conveyor housing with their washers or shims 16 extending over the bars. Positioning plates 34 extend over both bars 98 and 99 with some free play so that the entire base unit 97 can be displaced longitudinally along the upper and lower edge of base plate 1 into the various locking positions by means of only one handle 36 which is shown in FIG. 7. An L-shaped counter stop element 96 is connected with the swivelable end of the screw conveyor 25 and comprises a vertical square rod 37 and a bearing block 38 fastened on its upper end so as to be rotatable for the bearing bolt 39, see FIG. 8, of the screw conveyor 25. The square rod 37 which is depicted in FIGS. 7 and 8 has a hole in its lower end for being guided on a fixed pin 43 which guarantees the exact height of the screw conveyor 25 when the square rod comes to rest against the two threaded bolts or stop units 51. Depending on the various angular positions which are required of the screw conveyor 25, the square rod 37 is connected to bearing block 38 by means of a screw 46, as shown in FIG. 8, and a lock nut 47 so that it can always be pressed flat onto the head surface of the threaded bolt 51 by means of the swivelable supported eccentric 53. This eccentric is mounted to a swingable hinge 107. Hinge 107 is swingable on a pin 106.

Bearing block 38 is slotted as indicated in FIG. 8 by the dashed lines marked 105 and 105A. Clamping bolt 46 passes through the slot. When the bolt is tightened, bearing block 38 is clamped unto square rod 37 and the rotational axis of screw conveyor 25, which is also the axis of bearing bolt 39, is secured at a fixed angle relative to the guide rail. To change the angle of the screw conveyor axis it is only necessary to loosen bolt 46 and shift the bearing block 38 to the right or left in FIG. 8 to the extent necessary for accommodating a container of a particular size.

During a changeover, eccentric 53 needs only to be loosened to swivel to the side as in FIG. 7. Then the sliding carriage 70 is shifted off of the stop units 50 by means of its actuation device 82 or 7 and the base unit 97 is displaced in order to adjust to the new position. The reverse sequence of these steps results in again advancing the sliding carriage 70 after which the eccentric 53 is tightened again. This apparatus eliminates the previous inconvenience of manually adjusting the screw conveyor 25.

Note that in this sequence, the bolt 46 need not be loosened and tightened to change the angle of the screw conveyor. The bolt need only be locked at a predetermined location within the slot.

I claim:

1. Apparatus for changing the spacing between containers being conveyed in a single lane, comprising:
   a first conveyor driven longitudinally in a generally horizontal plane for conveying said containers in said single lane,
   a screw conveyor arranged adjacent said first conveyor to be driven rotationally about a horizontal axis for engaging the containers from one side to advance them longitudinally,
   means mounting said screw conveyor for pivotal movement about an axis perpendicular to said horizontal axis to set the angle of said horizontal axis relative to said first conveyor and means for securing said screw conveyor at the angle in which it is set,
   guide rail means extending along said screw conveyor on a side opposite of said one side of the first conveyor to retain said containers in the groove of the screw conveyor and to maintain the center points of containers of different sizes on the same line when they are discharged from said screw conveyor,
   carriage means for supporting said guide rail means and means for supporting said carriage means for generally transverse adjustment to selectively alter the distance and angle of the guide rail means relative to the first conveyor,
   at least one stop element on said carriage means, and
   a movable member adjustable crosswise of the direction of adjustment of said carriage means and a plurality of stop units mounted on said member and extending from said member by various amounts,
   adjustment of said member positioning a selected one of said stop units in the path of said stop element to control the position of said guide rail means.

2. The apparatus according to claim 1 including:
   a housing having front and rear walls between which said first conveyor translates, said walls having bearing holes,
   said carriage means including spaced apart parallel rods slidable through said bearing holes and having corresponding front ends disposed in front of said front wall and opposite corresponding rear ends disposed to the rear of said rear wall, and
   interconnecting means for interconnecting said rear ends in a manner to enable said rods to move a small distance independently of each other.

3. The apparatus according to claim 2 wherein said interconnecting means is a transversely extending bar member having free-play connections to said rods, respectively, at said rear ends of the rods.

4. The apparatus according to any one of claims 2 or 3 including:
   an elongated connecting rod mounted for sliding transversely relative to the longitudinal direction in which the containers are transported and having one end pivotally connected to said interconnecting means and another end arranged in front of said front wall, and
   a manually operable lever pivotally connected to said front wall and means for making a sliding connection between said lever and said another end of the connecting rod which is in front of the front wall, said lever when swung adjusting said carriage means transversely.

5. The apparatus according to claim 4 including a spring acting on said connecting rod to press said carriage and the said stop element thereon against one of said stop units.

6. The apparatus according to claim 2 including:
   an elongated threaded spindle and a thread supported on at least one of said front or said rear wall in which said threaded spindle is turnable, one end of said spindle being coupled to said interconnecting means and the other end being disposed in front of said front wall, and
   a manually operable handle on said spindle at said end in front of said front wall, rotation of said spindle in one direction by means of said handle causing said carriage to move in one direction for said stop element to move away from a stop unit and rotation of said spindle in an opposite direction moving said carriage and stop element in an opposite direction to press said element against said stop unit and retain the carriage in a fixed position.

7. The apparatus according to any one of claims 1, 2 or 3 wherein said stop units are arranged at a level below said guide rail means and are spaced apart in a longitudinal direction.

8. The apparatus according to claim 2 wherein said movable member comprises at least one horizontal longitudinally extending bar means mounted on said front wall of said housing for being shifted longitudinally to position a selected stop unit in alignment with a stop element on said carriage means.

9. The apparatus according to claim 2 including:
   a base member having two groups of stop units mounted thereon in longitudinally spaced relationship and with units in each group that are positioned correspondingly being spaced from each other, said base member being mounted for being shifted longitudinally, said carriage means having said at least one and at least another stop element longitudinally spaced from the one so that shifting of said movable member is able to align a corresponding stop unit from each group with the stop elements, respectively.

10. The apparatus according to claim 9 including a device on said movable member for locking said member in an adjusted position.

11. The apparatus according to claim 9 wherein said stop units are comprised of bolt means fastened to said movable member.

12. The apparatus according to claim 9 wherein one of said stop elements is mounted to the front end of one of said parallel rods and another stop element is mounted to the front end of the other rod.

13. Apparatus for changing the spacing between containers being conveyed in a single lane, comprising:
   a first conveyor driven longitudinally in a generally horizontal plane for conveying said containers in said single lane,
   a screw conveyor arranged adjacent said first conveyor for engaging the containers from one side to advance them longitudinally,
   guide rail means extending along said screw conveyor on a side opposite of said one side of the first conveyor to retain said containers in the groove of the screw conveyor and to maintain the center points of containers of different sizes on the same line when they are discharge from said screw conveyor, carriage means for supporting said guide rail means and means for supporting said carriage means for generally transverse adjustment to selectively alter the distance and angle of the guide rail means relative to a longitudinal axis of the screw conveyor, at least one stop element on said carriage means, a movable member adjustable crosswise of the direction of adjustment of said carriage means and a plurality of stop units mounted on said member and extending from said member by various amounts, adjustment of said member positioning a selected one of said stop units in the path of said stop element to control the position of said guide rail means, means mounting one end of said screw conveyor for swinging in a substantially horizontal plane to set the angle at which the axis of said screw conveyor is directed, support means mounted adjacent said first conveyors and including means for supporting the end opposite the one end of said screw conveyor for rotating, said support means being mounted for moving a small amount relative to said guide rail means to enable said screw conveyor to swing and change the angle of the axis of said screw conveyor relative to said first conveyor, and a plurality of stop units movable, respectively, into alignment with said support means to stop said support means to hold the screw conveyor at a desired angle.

14. The apparatus according to claim 13 including a housing having front and rear walls between which said first conveyor translates, said movable member is comprised of two interconnected parallel bars slidingly mounted to said front wall for shifting linearly, said stop units for the guide rail and the stop units for the screw conveyor support means, said stop units for the screw conveyor being mounted on said movable member.

15. The apparatus according to any one of claims 13 or 14 including means for locking said support means against the stop unit with which said support means is aligned.

16. The apparatus according to claim 15 wherein said means for locking comprises an eccentric element mounted adjacent said support means, rotation of said eccentric in one direction locking said support means to the stop unit aligned therewith.

* * * * *